United States Patent

[11] 3,634,829

[72] Inventors Anthony V. Campi
W. Long Branch;
Bruce H. Gray, New Shrewsbury, both of N.J.

[21] Appl. No. 79,106
[22] Filed Oct. 8, 1970
[45] Patented Jan. 11, 1972
[73] Assignee The United States of America as represented by the Secretary of the Army

[54] RESOLUTION OF ADDRESS INFORMATION IN A CONTENT ADDRESSABLE MEMORY
3 Claims, 2 Drawing Figs.

[52] U.S. Cl. .......... 340/172.5
[51] Int. Cl. .......... G11c 7/00
[50] Field of Search .......... 340/172.5

[56] References Cited

UNITED STATES PATENTS 3,202,964 8/1965 Heath, Jr. .......... 340/172.5 X
3,339,183 8/1967 Bock .......... 340/172.5
3,389,377 6/1968 Cole .......... 340/172.5
3,402,398 9/1968 Koerner et al. .......... 340/172.5
3,483,528 12/1969 Koerner .......... 340/172.5 X

*Primary Examiner*—Gareth D. Shaw
*Assistant Examiner*—Paul R. Woods
*Attorneys*—Harry M. Saragovitz, Edward J. Kelly, Herbert Berl and Jeremiah G. Murray

ABSTRACT: An address resolver for encoding the addresses of flagged information stored in an electronic memory. A matrix of cross conductors interconnected by diodes in the form of a binary tree has the $2^n$ input conductors connected to $2^n$ different two-state storage devices and the $n$ output conductors connected to $n$ AND gates. Under the control of a central processor, selected storage devices are set to indicate the location of the flagged information. The diodes are biased in one of two directions depending on whether the storage devices are set or reset. The bias on the diodes is detected by the AND gates and the results are stored in a register to indicate the highest address.

Figures 1, 2:
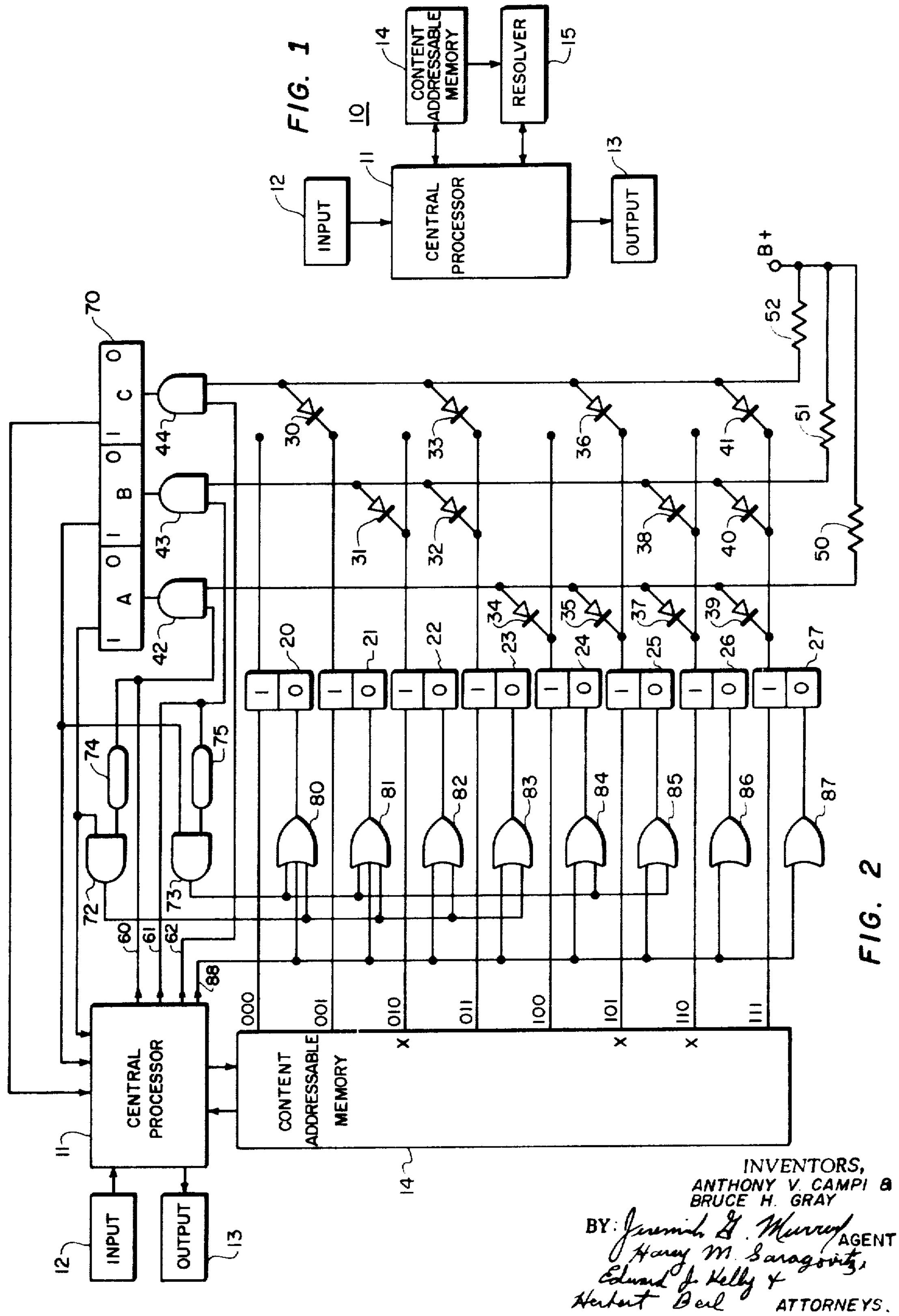

INVENTORS,
ANTHONY V. CAMPI &
BRUCE H. GRAY
BY: Jeremiah G. Murray AGENT
Harry M. Saragovitz,
Edward J. Kelly &
Herbert Berl ATTORNEYS.

RESOLUTION OF ADDRESS INFORMATION IN A CONTENT ADDRESSABLE MEMORY

The present invention relates generally to improvements in automatic data processors and the like and more particularly to new and improved devices for resolving the address of information contained in an electronic memory.

Those concerned with the development of content addressable memories have long recognized the need for a more economical and rapid means of determining the addresses of stored information from a multiplicity of flag bits. The present invention fulfills this need.

Address resolving devices may be characterized as employing primarily either active or passive elements. Prior art designs of the latter type usually employ magnetic cores or the like which are not readily miniaturized. Resolver designs which employ active elements such as transistors and diodes, on the other hand, are easily miniaturized by integrated circuit techniques. Because of this, the manufacture of resolvers having a large number of elements becomes more economical when active elements are used. Besides gaining an economical advantage in manufacture, the active element-type resolver can be designed to have a faster execution time because of the inherently faster switching time of transistors as compared to that of magnetic devices.

Therefore, the general purpose of this invention is to provide an economical and rapid resolver which may be readily implemented with active elements. The invention contemplates a unique combination of active elements such that the number of elements and the execution time for resolving an address are minimized.

It is therefore an object of the present invention to provide a device for resolving the address of information stored in a content addressable memory.

Another object is to provide an address resolver which may be readily implemented with active elements.

A further object of the present invention is the provision of a resolver capable of executing an ordered retrieval of addresses in a relatively short period of time.

Other objects and many of the attendant advantages of this invention will be readily appreciated as the same becomes better understood by reference to the following detailed description when considered in connection with the accompanying drawings wherein:

FIG. 1 is a block diagram of a general system and the location of the resolver therein; and FIG. 2 is a schematic diagram of a preferred embodiment of the invention.

Referring now to the drawing there is shown in FIG. 1 a general purpose digital computer or data processor 10 having a central processor 11 fed by an input device 12 and connected to an output device 13. Also connected to the central processor 11 is a content addressable memory 14 and a resolver 15. During the operation of the computer 10, the processor 11 may address the memory 14 by specifying the contents of specific words stored therein. The memory 14 may be asked to respond with the address locations of the words addressed (for example, the central processor 11 may ask the memory for the addresses of all words in memory 14 which begin with a binary 1). The memory 11 would normally respond to a search by setting selected ones of a plurality of flag bits which are contained in the memory and are associated with the address locations of the words contained therein. In other words, each memory location is provided with a flag bit and those locations which contain a word matching the word presented by the processor 11 will set the flag bit therein to indicate the match. The outputs of the flag bits are connected to the resolver 15 which generates coded addresses for those locations in memory 14 which have a set flag bit. The output of the resolver would then be a series of addresses corresponding to the locations of those words addressed (the addresses of all words starting the a binary 1, for example). As will be shown later, the resolver determines the addresses one at a time and resets the associated flag bit after each cycle. The central processor 11 may now use this address information to operate on the words addressed or merely provide it as an output via output device 13.

Referring now to FIG. 2 a detailed description of a resolver capable of resolving the addresses of an eight word memory will be described. Of course, the number of words in a standard memory could be in the thousands. The following description, therefore, is a simplified, illustrative example of the inventive concept.

Since the memory 14 has only eight words, all of the addresses may be represented by a three digit binary word. In FIG. 2, the eight flag bit output lines from memory 14 have written thereon the corresponding addresses 000 to 111. The flag bit lines 000 to 111 are connected to the set inputs of each of the flip-flops 20 to 27 respectively. The outputs of flip-flops 20 to 27 are connected to one of the inputs of each of three AND-gates 42, 43 and 44 via a matrix of cross conductors interconnected by diodes 30–41 in the form of a binary tree. The matrix includes a set of $n$ output conductors and $2^n$ input conductors. In the present case $n$ equals three and $2^n$ equals eight, the number of memory locations. A B+ voltage is connected via resistors 50, 51 and 52 to one end of the matrix. The inputs of AND-gates 42, 43 and 44 are connected to the control output lines 60, 61 and 62, respectively of processor 11. The outputs of AND-gates 42, 43 and 44 are connected to the three stages A, B and C respectively of a three-stage address register 70. The outputs of register 70 are connected to the central processor 11.

The processor outputs 60 and 61 are also connected via delays 74 and 75 to one of the inputs of AND-gates 72 and 73 respectively. The other inputs and AND-gates 72 and 73 are connected to the outputs of stages A and B of register 70.

The outputs of AND-gates 72 and 73 are selectively connected to the inputs of a series of OR-gates 80–85. OR-gates 80–87 have the outputs thereof connected to the reset inputs of flip-flops 20–27 respectively. Also connected to the inputs of OR-gates 80–87 is the reset output line 88 of processor 11.

The resolve operation starts under the control of the central processor 11 which first pulses line 88 to reset all flip-flops 20–27. Central processor 11 then energizes all flag bits in memory 14 which have been set. The energized flag bits in turn generate a pulse on the corresponding lines 000 to 111, thereby setting selected ones of the associated flip-flops 20–27. The addresses of the set flag bits are now resolved by determining which of the flip-flops 20–27 have been set. This is accomplished by testing the bias on the diodes of the binary matrix with the AND-gates 42, 43 and 44 under the control of the central processor 11 via lines 60, 61 and 62. The corresponding addresses will be stored, one at a time, in the address register 70, the outputs of which are connected to the central processor 11.

A step-by-step analysis of the operation will now be described and it will be assumed that, after an appropriate search of memory 14 by central processor 11, the only flag bits which have been set are those located at the addresses 110, 101 and 010 (this is indicated in FIG. 2 by the X next to these flag bit outputs).

The first step, as mentioned above, would be for the set flag bits to set flip-flops 22, 25 and 26. When one of the flip-flops 20–27 is set, the output thereof goes to ground thereby reversing the bias on the associated diodes 30–41 and causing the associated inputs to AND-gates 42, 43 and 44 to go to ground. Therefore, because flip-flop 26 has been set, the corresponding inputs to AND-gates 42 and 43 go to ground via diodes 37 and 38. Also, because flip-flop 25 has been set, the input to AND-gate 44 will go to ground via diode 36 and the input to AND-gate 42 will have a ground path through diode 35 in addition to the path through diode 37. Further, an additional ground path to AND-gate 43 is provided via diode 31 from the set flip-flop 22. It is pointed out that for purposes of this explanation, a ground potential will be considered a logical ONE and B+ will be a logical ZERO.

Central processor 11 will now continue control by providing a logical ONE to line 60, thereby causing a logical ONE to be stored in stage A of register 70. The storing of a ONE is stage A signifies that at least one of the addresses in memory 14 which has a set flag bit has a logical ONE in the most significant bit (MSB) position. In our example there are two such addresses, namely 101 and 110.

The output of stage A is connected to the input of AND-gate 72 as is a delayed version of the logical ONE on line 60. Therefore, a pulse will appear at the output of AND-gate 72 which will reset those flip-flops 20–23 which had previously been set. This is to insure that the only flip-flops 20–27 which are now set are those associated with an address which has an MSB of a logical ONE. In the present example, flip-flop 22 is now reset and the ground path through diode 31 is removed.

A logical ONE is now provided on line 61 by processor 11 and, because there is still a ground path through diode 38, a logical ONE output from AND-gate 43 will be stored in stage B of register 70. There will then be a logical ONE on the output of AND-gate 73, since both inputs are now a ONE, and any of the flip-flops 20, 21, 24 and 25 which had previously been set will now be reset. This is to insure that the only flip-flops 20–27 which are now set are those associated with an address having the two most significant bits both equal to a logical ONE. In the present example, only flip-flop 25 will be effected and the ground path to the input of AND-gate 44 via diode 36 will be removed. This leaves only flip-flop 26 set.

Continuing under the control of processor 11 the least significant bit (LSB) is resolved when a logical ONE is applied to line 62. In the present example, the input to AND-gate 44 is a logical ZERO since none of the flip-flops 21, 23, 25 and 27 is presently set. Therefore, when the logical ONE is applied to line 62, the output of gate 44 will be a logical ZERO which is now stored in stage C of register 70. At this point the address register 70 contains the largest address, having a set flag, i.e., 110.

The processor 11 will now reset the flag bit in memory 14 located at the address 110 and the next highest address having a set flag bit, i.e., 101, is resolved by repeating the above cycle.

The cycle is initiated when processor 11 pulses line 88 and resets the flip-flops 20 to 27. The flag bits in memory 14 are energized and the associated flip-flops 20–27 are set. The only flag bits energized in the example are now located at 101 and 010. Therefore, only flip-flops 22 and 25 will now be set. Next, line 60 is pulsed, thereby storing a logical ONE in stage A of register 70 since diode 35 is turned on. Also, after a time delay in delay 74, a flip-flop 22 is reset via gates 72 and 82. When line 61 is pulsed, a logical ZERO is stored in stage B of register 70 since none of the diodes 31, 32, 38 and 40 are turned on. Because diode 36 is turned on, a logical ONE is stored in stage C when line 62 is pulsed. At this point, the register 70 contains the address 101, which was the second highest address having a set flag bit.

The processor 11 will now reset the flag bit in memory 14 located at address 101 and continue on with the resolve cycle to obtain the address of the next highest location having a set flag bit, i.e., 010.

This process continues until all of the addresses having a set flag bit have been resolved. The last address to be resolved will, of course, be 000. Since, in the present case, the address 000 will always be resolved as the last address whether it has been flagged or not this particular output from register 70 can be used by central processor 11 as a halt signal. In this case, however, the location 000 in memory 14 cannot be used for storage.

Obviously, many modifications and variations of the present invention are possible in the light of the above teachings. it is therefore to be understood, that within the scope of the appended claims, the invention may be practiced otherwise then as specifically described.

What is claimed is:

1. A resolver for determining in sequence the $n$ digit binary addresses of $2^n$ memory locations each having a flag-bit means associated therewith comprising; $2^n$ storage means, each connected to a different one of said flag-bit means for assuming one of two stable states under the control of said flag-bit means; logic means including a matrix of cross conductors interconnected by diodes in the form of a binary tree connected to said storage means for determining in sequence the addresses of those said memory locations having the associated storage means in said one stable state; and output register means for registering the addresses determined by said logic means.

2. A resolver for determining in sequence the addresses of a plurality of memory locations each having a flag-bit means associated therewith comprising; an array of cross conductors having $2^n$ input conductors and $n$ output conductors, where $2^n$ is the number of said memory locations; a plurality of diodes interconnecting said $2^n$ input conductors and said $n$ output conductors in the form of a binary tree; biasing means connected to said output conductors for providing a source of bias potential to said diodes; a plurality of two-state storage means, each connected to a different one of said flag-bit means, for changing from a first stable state to a second stable state under the control of the associated flag-bit means; each said two-state storage means having the output thereof connected to a different one of said $2^n$ input conductors for establishing the condition of the bias on said diodes connected thereto; said diodes having one condition of bias when the associated two-state storage means is in a first stable state and having a second condition of bias when the associated two-state storage means is in a second stable state; output logic means connected to said $n$ output conductors for determining the bias on said diodes starting from one end of said tree and proceeding sequentially to the other end of said tree; and output storage means for storing sequentially the associated addresses of said two-state storage means in said second stable state.

3. The device according to claim 2 wherein, said output logic means includes gate means connected to each of said $n$ output conductors for detecting in sequence if any of the diodes connected thereto are in said second condition of bias; said output storage means having a plurality of digit storage means each connected to one of said gate means for assuming a predetermined stable state if the associated gate means detects a diode in said second condition of bias; and reset means connected to the output of each said digit storage means fore resetting all said two-state storage means connected to those input conductors not interconnected to the associated output conductor by one of said diodes.

* * * * *